April 5, 1966 F. W. ANTILA 3,244,021
ROLLER BEARING NUT
Filed Feb. 24, 1965
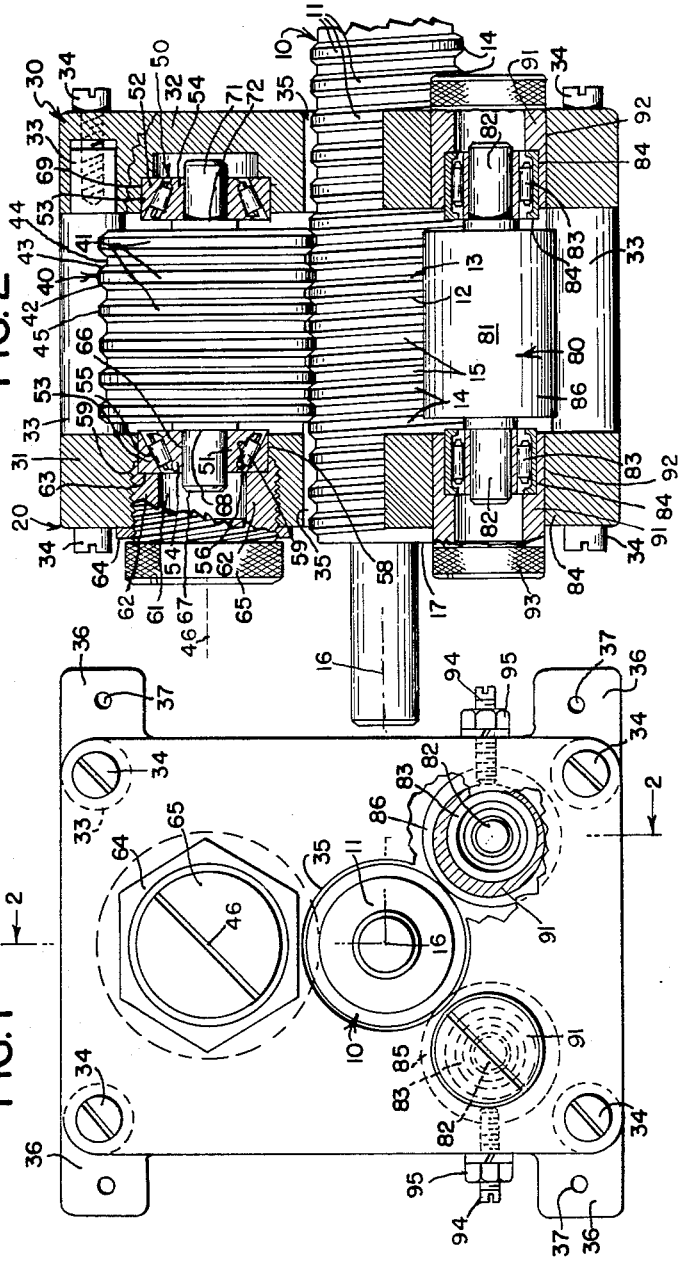
INVENTOR.
FRANK W. ANTILA
BY
Caswell Lagaard & Wicks
ATTORNEYS

United States Patent Office 3,244,021
Patented Apr. 5, 1966

3,244,021
ROLLER BEARING NUT
Frank W. Antila, 2406 Ercon Drive,
Brooklyn Center, Minn.
Filed Feb. 24, 1965, Ser. No. 434,850
6 Claims. (Cl. 74—424.8)

This application is a continuation in part of my copending application for patent, Serial No. 287,862, filed June 14, 1963, now abandoned.

The herein disclosed invention relates to threaded structures and particularly to threaded structures adapted to be used as the feed screws or lead screws of machine tools.

An object of the invention resides in providing a structure by means of which the movable member will arrive at substantially the same axial position for any circumferential position of feed or lead screw relative to the fixed member whether or not the rotary relative movement therebetween is clockwise or counter clockwise.

Another object of the invention resides in providing a structure in which relative movement of the parts may be procured with practically no backlash or play.

A still further object of the invention resides in providing a structure utilizing a screw with an Acme thread and a roller having spaced rings conforming thereto and cooperating therewith and causing relative axial movement therebetween upon relative circumferential movement of the screw and roller.

An object of the invention resides in providing reaction means including cylindrical rollers engaging the tops of the threads.

A still further object of the invention resides in providing means for moving one or a number of the rollers in an axial direction toward or from the feed or lead screw.

Other objects of the invention reside in the novel combination and arrangement of parts herein after illustrated and/or described.

In the drawings:

FIGURE 1 is an end view of a threaded structure illustrating an embodiment of the invention.

FIGURE 2 is a longitudinal sectional view taken on line 2—2 of FIGURE 1.

The structure shown in the drawings consists of a screw 10 and a nut 20 screwed thereon. These two parts are relatively rotatable and upon rotation, one of said parts advances relative to the other. In one particular use, namely as a feed screw, the screw rotates but is held from axial movement. In such case, the nut is held from rotation but advances on the screw.

The screw 10 is provided with threads 11 of the type ordinarily known as Acme thread, which have sides 12 and 13 converging outwardly and tops 14 and bottoms 15, cylindrical in form. Means are provided for supporting and rotating the screw and/or holding it from axial movement or any movement at all, as the case may be. Such construction being well known in the art and forming no particular feature of the invention has not been shown in the drawings.

The nut 20 consists of a case 30 which comprises spaced end plates 31 and 32. Posts 33 are disposed between the two end plates and screws 34, passing through said end plates and screwed into the posts hold the parts assembled. The end plates 31 and 32 have aligning holes 35 in them and through which the screw 10 passes freely.

Cooperating with the screw 10 is a roller 40. This roller is provided with axially spaced rings 41, which are separate and not helical like the threads 11 on the screw 10. These rings are of a shape conforming to the shape of the threads 11 and have outwardly converging sides 42 and 43 engaging the sides 12 and 13 of the threads. These threads have tops 44 and bottoms 45 which clear the bottoms 15 and the tops 14 of the threads 11. The axis 46 of the roller 40 is coplanar and parallel with the axis 16 of the screw 10.

The roller 40 is mounted in bearing means 50, which consist of two roller bearings 51 and 52. Both of these bearings being the same; only bearing 51 will be described in detail, and the same reference numeral will be applied to the corresponding parts of each bearing.

Bearing 51 is mounted in plate 31 and consists of two races 53 and 54 which have facing conical surfaces 55 and 56. Between these surfaces are conical rollers 59, which roll about said surfaces. The race 51 is received in a bore 58, formed in the end plate 31 and which occupies the inner portion of said plate. The outer portion thereof is formed with threads 59 which receive a threaded bushing 62. This bushing has a bore 61 in the same and which leaves an annular shoulder 63 on said bushing engageable with the end of the race 53. A lock nut 64 is screwed on the bushing 62 and engages the outer surface of the plate 31 and holds the bushing from movement. The bushing 62 may be turned by means of a knurled head 65 on the end of the same. The race 54 is formed with a bore 66 which receives a stub shaft 67 on the end of the roller 40, and concentric therewith. The end of the race 54 butts up against a shoulder 68 formed on the roller 40 adjacent the inner end of the stub shaft 67.

The race 53 of the bearing 52 is received in a socket 69 formed in the end plate 32. The inner race 54 of said bearing receives a stub shaft 71 formed on the other end of the roller 40 and butts up against a shoulder 72 similar to the shoulder 68. By the proper adjustment of the bushing 61, the tightness between the races of the two bearings and the rollers therein can be adjusted at will.

For further supporting, the screw 10 reaction means 80 is employed, which includes two rollers 85 and 86, and which are identical in construction. For this reason only the roller 86 and associated structure will be described in detail. This roller has a cylindrical surface 81, which is adapted to engage the tops 14 of the threads 11 of screw 10. These rollers are spaced circumferentially of the screw with respect to one another and also with respect to the roller 40. The roller 86 is provided with stub shafts 82 at its ends and which are journaled in needle bearings 83 received in sockets 84, formed in eccentric cylinders 91 and which are eccentric relative to the axis of said cylinders. These cylinders are rotatably mounted in bores 92 formed in the end plates 31 and 32. The ends 93 of said cylinders extend outwardly beyond the end plates 31 and are knurled to permit of rotation of the same. For holding the cylinders in adjusted position set screws 94 are employed which are screwed into the end plates 31 and 32 and which are locked into position by means of lock nuts 95.

In the design of the threaded structure, the rings 41 are made so that the sides 42 and 43 engage the sides 12 and 13 of the threads 11 of the screw 10 but so that the bottoms and tops thereof clear the tops and bottoms of the threads, thus pressure from the roller 40 is transmitted to the screw 10 through the sides of the threads. At the same time the reaction therefrom is transmitted to the reaction means 80 through the tops 14 of the threads 11 of screw 10 by means of the surfaces 81 of rollers 85 and 86. The bearings 51 and 52 are located so that the end play between the roller 40 and case 30 may be completely taken up by the adjustment of the bushing 62. Play between the threads 11 and rings 41 is completely taken up by adjustment of one or both of the rollers 85 and 86 through eccentrics 91 whereby rotational movement of the screw 10 relative to the case 30 brings said case to the same position whether or not the screw is turned in one direction or the other. As previously stated, the nut 30 may be used as a rotating nut or as a relatively fixed nut and similarly the screw 10 may be used as a fixed screw or as a screw which rotates and moves axially or which rotates and which is restrained from axial movement.

The method of using the invention is obvious. The screw and nut are mounted in the structure in which they are to be employed in any suitable manner. As an example, the case 30 of nut 20 may be attached to the structure with which it is to be employed by means of ears 36 issuing from the plate 32 and which have holes 37 in the same and through which bolts or other fasteners may be passed. Likewise, the screw 10 may be formed with a reduced portion 16 to which means for rotating the same may be attached and on which end thrust and radial bearings may be mounted for engagement with a shoulder 17 on said screw to restrain axial movement thereof and to journal the screw for rotation. The same construction may also be employed at the other end of the screw. When desired for use, the bushing 62 is tightened up until all of the end play is taken out of the roller 40 and the eccentrics 91 adjusted so that both radial and longitudinal movement is eliminated between the screw 10 and roller 40. The threaded structure is manipulated in the ordinary manner.

If desired, the bearings 51 and 52 may be mounted in eccentrics, the same as the bearings 83 and roller 40 may also be adjusted in a radial direction.

The advantages of the invention are manifest. The device reduces play and backlash between the nut and screw to a minimum so that any setting of the screw in a circumferential direction relative to the nut will produce the same position of the nut whether or not the circumferential position is derived through clockwise or counter clockwise rotation. The nut is extremely compact and the structure can be designed for small screws where little space is available. The threads on the screw are conventional threads and may be readily constructed by the usual procedure and equipment. Only two accurately machined threaded parts are required, the screw 10 and the roller 40 so that binding of the parts is prevented and uniform resistance to the travel of the nut relative to the screws occurs throughout the entire length of travel the nut along the screw. The entire structure can be economically fabricated at an extremely reasonable cost.

Changes in the specific form of the invention, as herein described, may be made within the scope of what is claimed without departing from the spirit of the invention.

Having described the invention, what is claimed as new and desired to be protected by Letters Patent is:

1. In a threaded structure, a screw having helically extending continuous threads formed with outwardly converging sides and cylindrical tops, a roller having separate axially spaced circular rings formed with outwardly converging sides disposed between the threads of said screw and adapted to engage the sides of said threads, said roller upon rotation of said screw being moved axially by said rings, bearing means for supporting said roller for rotation and reaction means engaging the tops of the threads on said screw and resisting the radial thrust of said rings on said threads.

2. In a threaded structure, a screw having helically extending continuous threads formed with outwardly converging sides and cylindrical concentric tops, a roller having separate axially spaced circular rings formed with outwardly converging sides adapted to engage the sides of said threads, said screw upon rotation being moved axially by said rings, rollers having cylindrical surfaces engaging the tops of said threads, and bearing means for supporting said rollers for rotation.

3. In a threaded structure, a screw having Acme threads thereon, a roller having separate axially spaced circular rings conforming to and cooperating with said threads, bearing means for supporting said roller for rotation, and a pair of circumferentially spaced cylindrical rollers with cylindrical surfaces engaging the tops of said threads at localities circumferentially spaced from said first named roller.

4. In a threaded structure, a screw having helically extending continuous threads formed with outwardly converging sides and cylindrical concentric tops, a roller having separate axially spaced circular rings formed with outwardly converging sides adapted to engage the sides of said threads, said screw upon rotation being moved axially by said rings, bearing means for supporting said roller for rotation, rollers having cylindrical surfaces engaging the tops of said threads, bearing means for supporting said last named rollers for rotation, and means for moving one of said rollers toward the other.

5. In a threaded structure, a screw having helically extending continuous threads formed with outwardly converging sides and cylindrical concentric tops, a roller having separate axially spaced circular rings formed with outwardly converging sides adapted to engage the sides of said threads, said screw upon rotation being moved axially by said rings, bearing means for supporting said roller for rotation, rollers having cylindrical surfaces engaging the tops of said threads, bearing means for supporting said last named rollers for rotation, the bearing means for one of said last named rollers being radially movable, eccentric means engaging said movable bearing means for moving the said roller journalled, thereby toward another of said rollers.

6. In a threaded structure, a screw having Acme threads thereon, a roller having separate axially spaced circular rings conforming to and cooperating with said threads, bearing means for supporting said roller for rotation, a pair of circumferentially spaced cylindrical rollers with cylindrical surfaces engaging the tops of said threads at localities circumferentially spaced from said first named roller, bearing means for each of said last named rollers, and means for moving the bearing means of one of said last named rollers toward the axis of said screw.

References Cited by the Examiner

UNITED STATES PATENTS

| | | | |
|---|---|---|---|
| 2,525,326 | 10/1950 | Wahlmark | 74—424.8 |
| 2,831,363 | 4/1958 | Lohr | 74—424.8 |
| 3,004,445 | 10/1961 | Mondon | 74—424.8 X |

FOREIGN PATENTS 399,084  10/1942  Italy.

DAVID J. WILLIAMOWSKY, *Primary Examiner.*

DON A. WAITE, *Examiner.*

L. H. GERIN, *Assistant Examiner.*